(12) United States Patent
Hall

(10) Patent No.: US 6,565,026 B1
(45) Date of Patent: May 20, 2003

(54) TIRE CHOPPING APPARATUS

(75) Inventor: Roger D. Hall, Kansas City, MO (US)

(73) Assignee: Specialty Grinding, Inc., Lee's Summit, MO (US)

(*) Notice: Subject to any disclaimer, the term of this patent is extended or adjusted under 35 U.S.C. 154(b) by 0 days.

(21) Appl. No.: 09/940,602

(22) Filed: Aug. 28, 2001

(51) Int. Cl.[7] .............................................. B02C 19/12
(52) U.S. Cl. .................. 241/225; 241/243; 241/DIG. 31
(58) Field of Search ........................ 241/DIG. 31, 243, 241/242, 222, 224, 286, 225, 285.3, 101.761

(56) References Cited

U.S. PATENT DOCUMENTS

| | | |
|---|---|---|
| 864,691 A | 8/1907 | Rice |
| 3,580,517 A | 5/1971 | Ehrlich |
| 4,015,782 A | 4/1977 | Granite |
| 4,033,515 A * | 7/1977 | Barcell et al. ................. 241/27 |
| 4,066,216 A * | 1/1978 | Waldrop et al. ............ 241/190 |
| 4,205,799 A | 6/1980 | Brewer |
| 4,374,573 A | 2/1983 | Rouse et al. |
| 4,394,983 A | 7/1983 | Ulsky |
| 4,684,071 A | 8/1987 | Dicky |
| 4,801,101 A | 1/1989 | Dreyer et al. |
| 4,927,088 A | 5/1990 | Brewer |
| 5,024,386 A | 6/1991 | Morris |
| 5,094,392 A | 3/1992 | Szombathy |
| 5,340,040 A * | 8/1994 | Bussiere et al. ...... 241/101.761 |
| 5,375,775 A | 12/1994 | Keller et al. |
| 5,402,950 A | 4/1995 | Blair |
| 5,562,255 A | 10/1996 | Witko et al. |
| 5,676,320 A | 10/1997 | Merlinger |
| 5,829,690 A | 11/1998 | Deschamps |
| 5,904,305 A | 5/1999 | Kaczmarek |
| 5,927,627 A | 7/1999 | Edson et al. |
| 5,971,305 A | 10/1999 | Davenport |

* cited by examiner

*Primary Examiner*—Mark Rosenbaum

(57) ABSTRACT

A tire chopping apparatus includes a rotor assembly with a plurality of circumferentially and axially spaced rotor teeth which cooperate with a plurality of stationary teeth supported on a shear bar assembly to shearingly engage tire carcasses to reduce the carcasses to smaller fragments. A plurality of axially spaced guards extend outwardly from the shear bar assembly toward the rotor assembly and limit the size of fragments which can pass through a shear zone formed by the interengaging rotary and stationary teeth. The guards may be in the form of bridge plates spanning the rotor assembly or upstanding guard plates which extend upwardly from the shear bar assembly and include a distal end which extends outwardly toward and in horizontally spaced relation to the rotor mandrel.

29 Claims, 5 Drawing Sheets

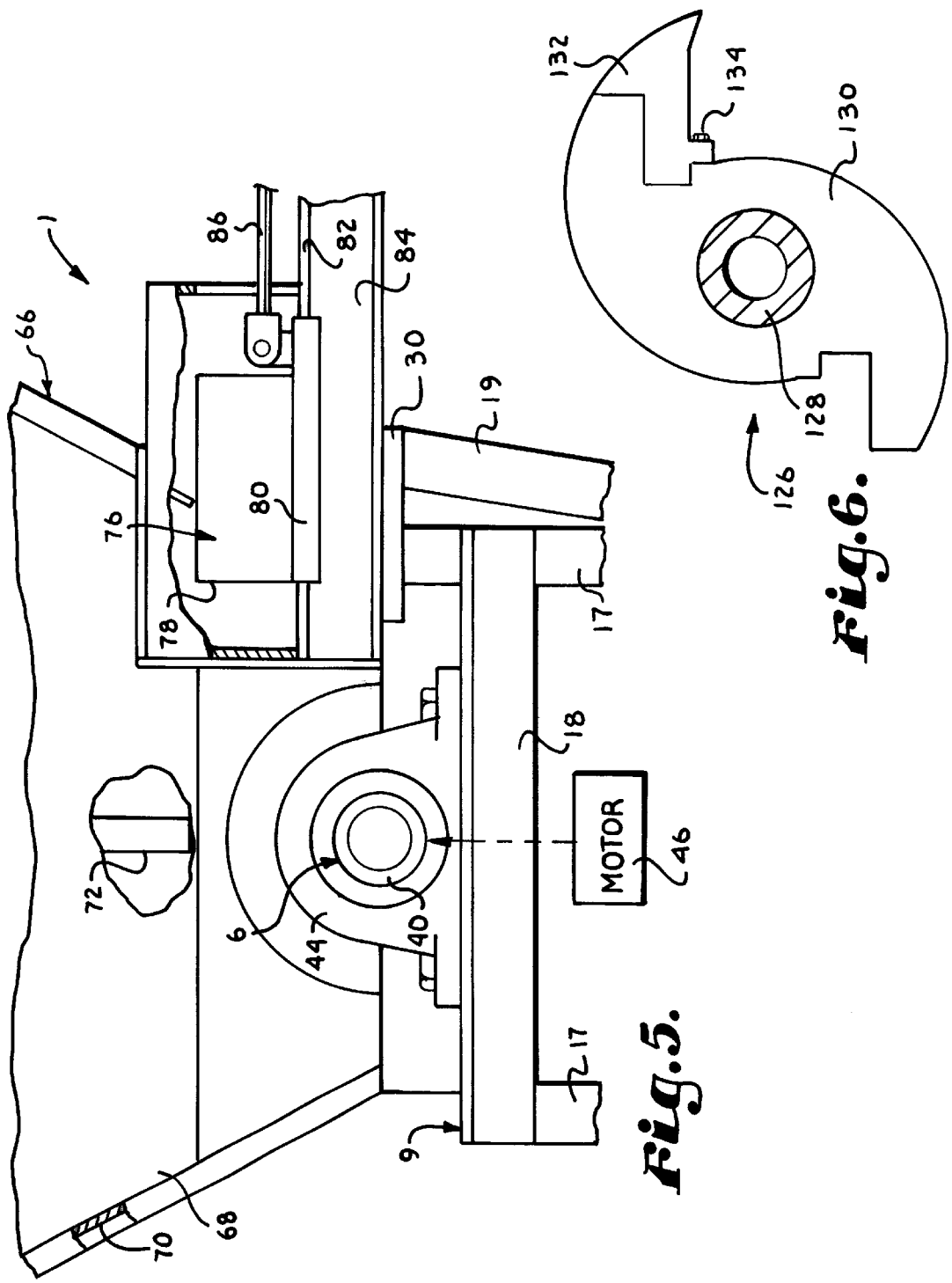

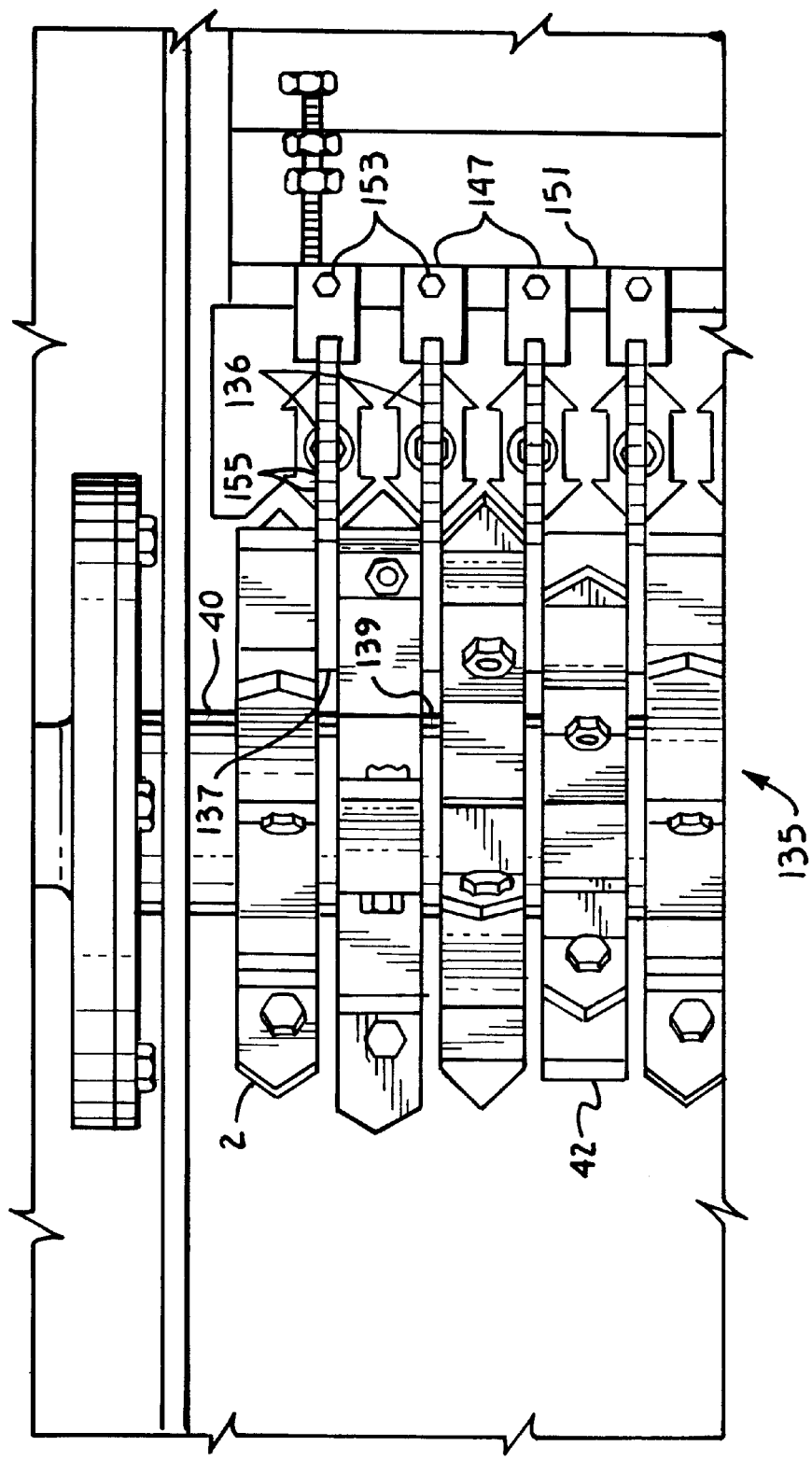

TIRE CHOPPING APPARATUS

BACKGROUND OF THE INVENTION

1. Field of the Invention

The invention relates to the field of grinders for reducing discarded tires into smaller pieces for disposal or recycling.

2. Description of the Related Art

The disposal of worn tires is complicated by the material characteristics that are designed into them. Thus, the tendencies of modern tires toward structural integrity and weather resistance that make them serviceable for long periods of time also make their disposal more difficult. There are problems with simply placing whole tire carcasses in landfills. The voids in the carcasses give them a tendency to float to the surface over time and can cause an undesirable softness or sponginess and, thus, instability to the overall landfill. Simply accumulating tires in the open often results in water collecting in the carcasses, which promotes the breeding of mosquitos and other pests. Additionally, while tires are not highly flammable, fires occurring in large collections of tires are highly polluting, as well as difficult and dangerous to extinguish.

In order to facilitate the disposal of tires, machines have been developed to reduce tire carcasses to smaller pieces ranging in size from several inches in extent down to small pellet sizes. The larger sized "chunks" are suitable for further processing, such as reduction to a smaller size or, alternatively, for more convenient disposal in a land fill. The smaller pellet size particles are suitable for disposal in land fills, but also for such uses as a component of road paving materials or as a component of a fuel, as for steam generation.

Conventional machines for chopping or comminuting tire carcasses include hammer mills having rotating blades or teeth which shear the carcasses into pieces in cooperation with additional sets of counter-rotating teeth or shear bars with stationary sets of teeth. One problem with conventional tire chopping machinery is that the moving blades tend to pull the entire carcass through the sets of teeth before it can be fully reduced. This can cause a "jam" in the machine, requiring interruption of carcass processing and, possibly, requiring partial disassembly of the machine to clear. In some cases, damage to the machinery can occur, such as by deforming a mandrel on which the rotating tooth structures are mounted, the shear bar, or both. In any case, the oversized pieces must be retrieved and reprocessed. Often, such machinery incorporates size classifiers to separate larger pieces of tires to be reprocessed from those which can be passed on, as by a conveyor, to the next process or to a place of collection.

SUMMARY OF THE INVENTION

The present invention provides an improved tire chopping apparatus for comminuting or reducing tire carcasses to smaller fragments. The apparatus includes a support framework on which a rotor assembly is positioned, along with a stationary shear bar. The rotor assembly is formed by a central mandrel onto which are mounted a plurality of axially spaced chopper "discs". The chopper discs are somewhat pinwheel shaped and provide a structure on which a plurality of replaceable rotor teeth are mounted. The shear bar includes a plurality of laterally spaced shear teeth which are also replaceable.

The rotor teeth, or rotor shear tools, are positioned in an outwardly or radially extending and circumferentially spaced orientation. The chopper discs are oriented in such a manner that the teeth thereon are angularly staggered from one disc to the next in a multiple "chevron" or V-shaped pattern of teeth in adjacent discs. In general, the staggering of the teeth limits the number of teeth "biting" into a carcass at the same time to reduce the torque requirements for a rotor motor to drive the rotor assembly and to avoid bogging down such a motor. The chevron pattern of the rotor teeth is oriented in such a direction relative to rotation that carcasses are urged laterally in relation to the rotor assembly to avoid jamming of carcasses at single section of the rotor assembly. To some extent, the lateral carcass movement caused by the chevron rotor teeth pattern tends to "churn" a group of tires within the hopper to thereby prevent bunching up or jamming of the apparatus by too many carcasses being fed at one time.

Additional jamming prevention is provided by a plurality of guards which are spaced along the rotor assembly and positioned respectively between the chopper discs. The guards are oriented in vertical planes and extend between the rotor assembly and the shear bar to form a "classifier" or grate to limit the size of carcass fragments which can pass through a chopper or shear zone at which the rotor and shear teeth engage the carcasses. Carcass fragments too large to pass between the guards, or be driven therebetween by the rotor teeth, are positioned to be engaged and reduced by the rotor teeth in cooperation with the shear teeth.

In a first embodiment of the present invention, the guards take the form of bridge plates, which are generally C-shaped with radial extensions at the ends. The bridge plates are retained at one end by engagement or hooking under frame structure of the tire hopper and at the shear zone by the shear teeth and are, thus, removable and replaceable if worn, damaged, or dislodged. As tire carcasses are urged toward the shear teeth by contact with the moving rotary teeth, engagement of the carcasses with the bridge plates prevents them from being drawn between the rotor and shear bar. Only after the carcasses are reduced to much smaller size can they be drawn through.

In a modified embodiment of the tire chopping apparatus, the guards are in the form of upstanding guard plates which extend upwardly from the shear bar proximate each of the stationary shear teeth and outwardly toward the rotor mandrel. The guard plates are cantilevered from the shear bar so that a gap remains between the distal end of the guard plate and the rotor mandrel. The gap allows hard to grind fibrous materials, such as the steel belting from steel belted radial tires, to pass through the machine, while still preventing large pieces of tire carcass from being drawn through. The upper edge surface of each guard plate slopes downwardly toward the gap so that belt material is more likely to fall through the gap instead of building up on the guard plate. The upper edge surface may further be provided with a plurality of teeth arrayed in a ratchet or stair-step pattern to help prevent the tire carcasses from being pushed away from the shear zone by the action of the rotor.

The shear bar is mounted on its supporting framework in such a manner that a shear gap between the shear teeth and the rotor teeth can be adjusted. Adjustment of the shear gap is desirable to selectively control the shear relationship between the moving and stationary teeth. If the shear gap is too small, excessive wear, or breakage, of the teeth can occur. Conversely, too large a shear gap reduces the effectiveness of the teeth in converting the carcasses into smaller fragments and may result in jamming of the shear zone for that reason. Additionally, periodic adjustment of the shear gap is required to compensate for wear of the rotor and shear teeth. In the present chopper apparatus, the shear bar is slidably mounted on the support framework and is engaged by a mechanism such as bolts which can be driven inwardly or outwardly to adjust the position of the shear teeth relative to the rotor teeth. Once the desired position has been achieved, the bolts can be secured in position, as with lock nuts.

Although the tire chopping apparatus could be installed and operated in a stationary configuration, a preferred embodiment of the present invention is mounted on a chassis of a movable trailer or on a self-propelled vehicle. This allows more flexible and efficient use of the present invention, since it can be transported to a quantity of tire carcasses to be processed, rather than the carcasses being transported to and then from the apparatus. The apparatus support frame is mounted on the vehicle chassis and has the rotor assembly journaled thereon. The apparatus frame also supports the shear bar, the feed hopper, and the feed bumper. A rotary hydraulic motor is engaged between the support frame and the rotor assembly. The feed bumper includes one or more linear hydraulic motors or cylinders which are controlled to reciprocate the bumper toward and away from the rotor.

The chassis also preferably has a conveyor, such as a belt conveyor, positioned below the shear zone and conveys the tire carcass fragments to a storage location or container. The apparatus may also include equipment to load tire carcasses into the feed hopper, such as a grapple mounted on a boom. Although the chopping apparatus is described principally in terms of processing tire carcasses, it could also be used for other purposes, such as for comminuting refuse building materials from demolitions and rehabilitation projects, and other materials. For such other applications, some variations in dimensions, spacing of the guards, tolerances, and the like may be required, in comparison to an apparatus suitable for chopping tire carcasses. However, such variations are believed to be within the scope of the present invention.

BRIEF DESCRIPTION OF THE DRAWINGS

FIG. 5 is a side elevational view of the apparatus at a somewhat reduced scale, and illustrates support structure of the apparatus, with portions broken away to illustrate further details of a feed control bumper.

FIG. 6 is a side elevational view at an enlarged scale of a modified chopper tooth and a rotary mounting structure for the modified chopper tooth, for use on a first modified embodiment of the apparatus of the present invention.

FIG. 8 is a fragmentary plan view of the second modified embodiment of the apparatus taken generally along line 8—8 in FIG. 7 and illustrates further details of a rotor and a shear bar of the apparatus.

DETAILED DESCRIPTION OF THE PREFERRED EMBODIMENTS

Figure 1:
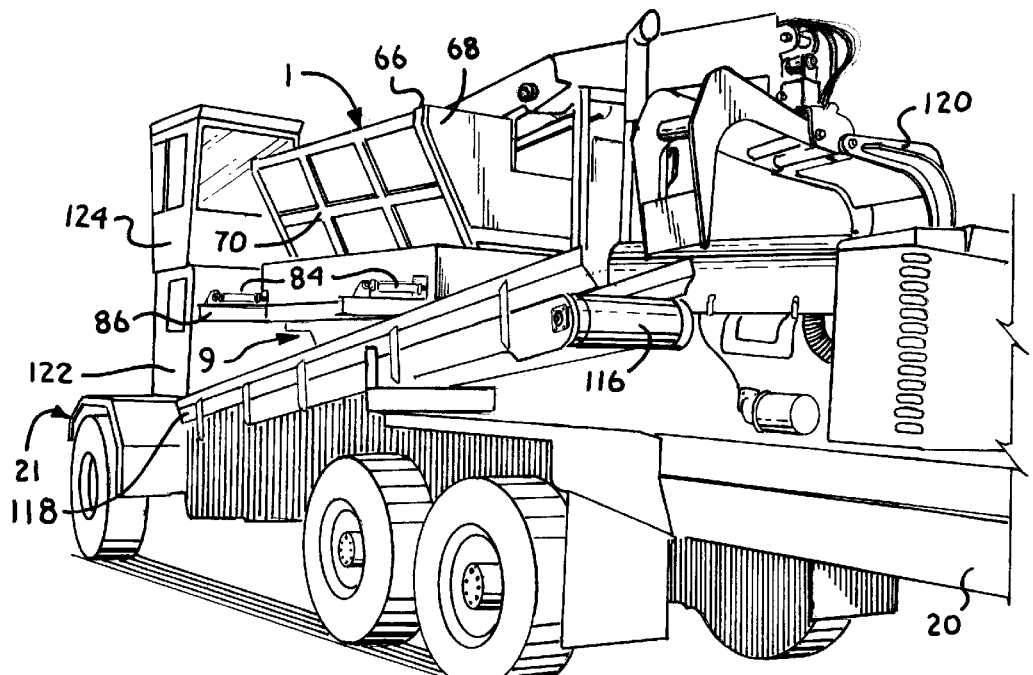
FIG. 1 is a perspective view of a tire chopping apparatus which embodies the present invention, shown mounted on a self-propelled vehicle.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates a tire chopping apparatus which embodies the present invention. The tire chopping apparatus 1 generally includes sets of rotary teeth 2 and stationary teeth 3 (FIGS. 3 and 4) which are so positioned as to engage carcasses of tires and reduce them to smaller fragments by a shearing action. The rotary teeth 2 are mounted on a rotor assembly 6, and the stationary teeth 3 are mounted on a shear bar assembly 7. The rotor assembly 6 and shear bar assembly 7 are mounted on a frame or framework 9. In the apparatus 1 of the present invention, bridge plates 12 are interspersed among sets of the rotary teeth 2 and stationary teeth 3 to limit the size of fragments which can pass through a shear zone 14 at which the rotary teeth 2 and stationary teeth 3 engage tire carcasses.

The frame 9 is formed by upstanding members 17 which are interconnected by cross members 18 and braces 19 (see FIG. 5). In the illustrated apparatus 1, the frame 9 is preferably supported on a chassis 20 of a self-propelled vehicle 21 (FIG. 1). Alternatively, the chassis 20 could be a towable vehicle, such as a trailer, or the frame 9 could be positioned in a stationary installation. Mobility of the apparatus 1, as provided by the vehicle 21, increases its flexibility of use since it can be moved from site to site as needed.

Figure 3:
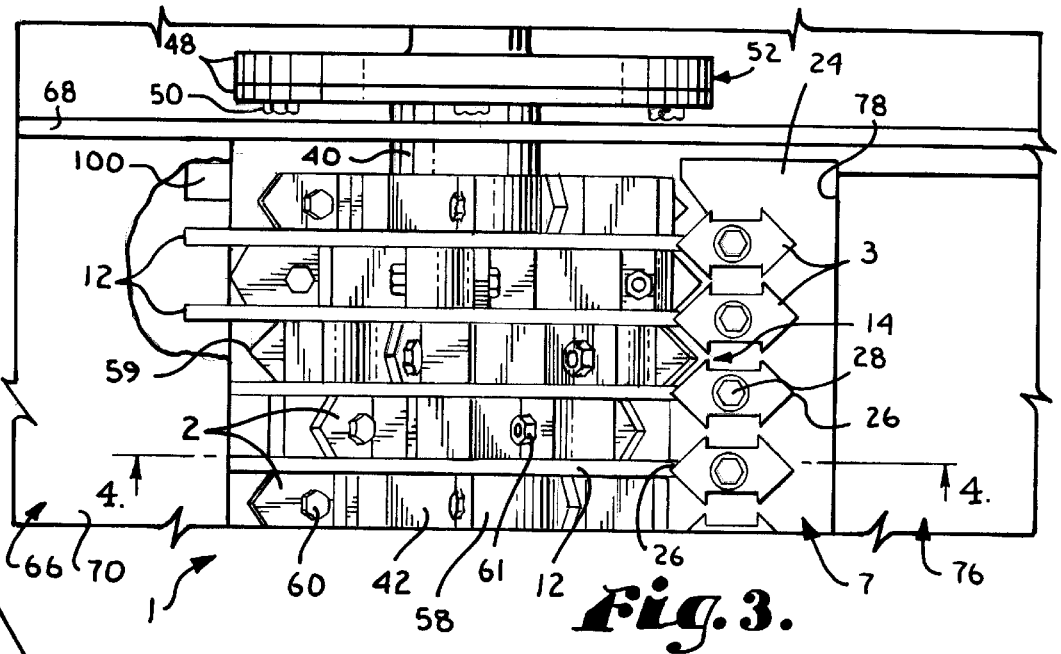
FIG. 3 is a fragmentary plan view of the apparatus and illustrates details of a rotor and a shear bar of the apparatus.
Figure 4:
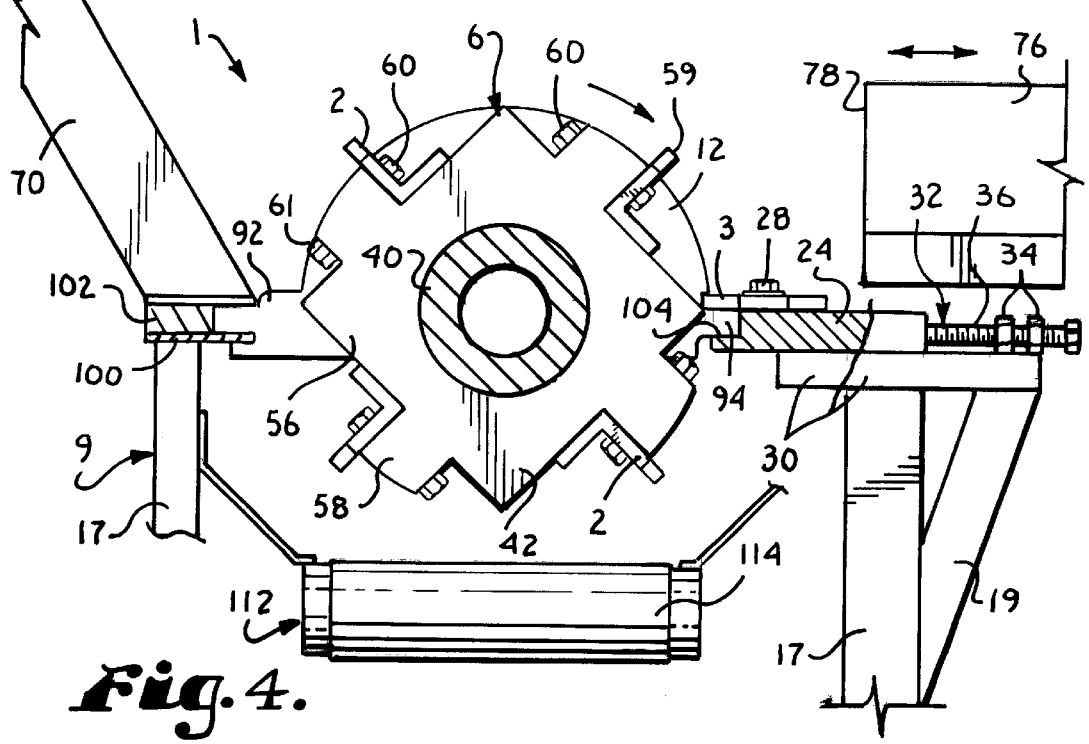
FIG. 4 is fragmentary sectional view taken on line 4—4 of FIG. 3 and illustrates further details of the rotor and shear bar of the apparatus.

Referring to FIGS. 3 and 4, the stationary shear tools or shear teeth 3 are regularly spaced along a shear bar support member 24. The illustrated shear teeth 3 have the shape of short, double-ended arrows with points 26 at opposite ends. The shear teeth 3 are secured to the member 24, as by shear tooth bolts 28, allowing the teeth 3 to be reversed or replaced when worn or broken. The shear bar support member 24 is slidably mounted on a horizontal shelf member 30 and includes a shear adjustment mechanism 32 engaged between the support member 24 and shelf member 30. An illustrated adjustment mechanism 32 includes one or more fixed nuts 34 through which adjustment bolts 36 are threaded to engage the support member 24. The mechanism 32 allows a shear tolerance between the shear teeth 3 and rotary teeth 2 to be adjusted to establish a desired shear relationship between the teeth 2 and 3 and to compensate for wear thereof. Although the illustrated plurality of stationary shear members 3 is preferred as most practical and most easily maintained, it is foreseen that a single elongated shear blade (not shown) could replace the plurality of shear teeth 3.

The illustrated rotor assembly 6 includes a mandrel or axle 40 onto which are positioned a plurality of axially spaced tooth support "wheels" or plates 42. The wheels 42 are secured to the mandrel 40, as by welding; however, other methods of securing the wheels 42 to the mandrel could alternatively be employed. The rotary teeth 2 are replaceably mounted on the wheels 42. The illustrated mandrel 40 is a hollow cylindrical tube formed of steel and may have a diameter in the range of six to eight inches and a wall thickness of about one to two inches. The rotor assembly 6 is mounted on the frame 9 by engagement of ends of the mandrel 40 with pillow blocks 44, one of which is shown in FIG. 5 which are connected to cross members 18 of the frame 9. A rotary motor 46 is engaged with the mandrel 40 to cause rotation of the rotor assembly 6. Preferably, the motor 46 is a hydraulic motor and may engage the mandrel 40 through a transmission (not shown).

Referring to FIG. 3, the motor 46 preferably also engages the mandrel 40 through a set of shear plates 48 connected by shear bolts 50. The shear plates 48 and bolts 50 form a torque limiter 52 which prevents damage to the motor 46, or to the hydraulic system associated therewith, should the rotor assembly 6 become seized, as by a tire carcass getting jammed between the rotor teeth 2 and the shear teeth 3. In such a case, the bolts 50 fail at a rated shear load to thereby separate the connection between the shear plates 48. For example, the illustrated torque limiter 52 has four shear bolts 50, each rated appropriately for a total torque limit of 64,000 foot-pounds at the radius where the bolts are positioned. Although not shown, the motor 46 includes appropriate hydraulic controls, a hydraulic pump, and a hydraulic reservoir. Such a hydraulic pump and reservoir can also be used by other hydraulically operated equipment on the chassis 20 and vehicle 21. The hydraulic components may also be protected by hydraulic pressure switches and/or relief valves (not shown) which are appropriately installed to prevent damage thereto from excessive operational pressures.

The illustrated tooth supporting wheels 42 have a pinwheel shape formed by a square inner body section 56 and radial tooth support projections 58. The illustrated rotary shear members or teeth 2 are L-shaped, although the teeth 2 could alternatively be flat, and terminate in angularly pointed ends 59. The pointed ends 59 aid in snagging the tire carcasses to pull them into shearing engagement with the shear teeth 3. The teeth 2 are secured to the projections 58 by bolts 60 and nuts 61. On the apparatus 1, four rotary teeth 2 are mounted on each wheel 42. However, the rotor assembly 6 could be adapted to provide for a lesser or greater number of rotary teeth 2 mounted on each wheel 42. If a greater number of teeth 2 per wheel 42 were employed, the square inner body section 56 would be replaced with a regular polygon with an appropriate number of sides, or by a disc, such that the wheel 42 would then assume a more wheel-like appearance. The tooth support wheels 42 are axially spaced apart a sufficient distance to enable the bridge plates 12 to be positioned between the moving wheels 42 and teeth 2.

As can be seen from FIG. 3, the tooth support wheels 42 are staggered angularly from one to the next. The overall pattern of staggered teeth 2 is in a V-shaped or "chevron" pattern or in a multiple chevron. Such a chevron pattern preferably configured to reduce the collection of carcasses at a single axial region of the rotor by urging the carcasses to move in a direction parallel to the axis of the rotor 6. Staggering of the teeth 2 also limits the number of teeth 2 engaging the carcasses in the shear zone 14 at a given time, to thereby reduce tendencies to overload the rotor motor 46.

Referring to FIG. 5, the apparatus 1 includes structure and mechanisms to facilitate feeding tire carcasses into the shear zone 14 for processing. A feed hopper 66 is positioned to direct carcasses by gravity into the shear zone 14. The hopper 66 includes upstanding end walls 68 and outwardly angled side walls 70. The hopper 66 is supported by the framework 9 and a lower opening of the hopper 66 is positioned in surrounding relation to the rotor assembly 6, the shear bar assembly 7 and the shear zone 14. The hopper 66 may include a generally upstanding feed barrier wall 72 (FIG. 5) which has its ends secured to the end walls 68 or the hopper 66. The feed barrier 72 is positioned generally over the rotor assembly 6 and tends to cause the tire carcasses to assume an upstanding orientation for more effective engagement by the rotary and stationary teeth 2 and 3.

The chopping apparatus 1 includes a reciprocating bumper mechanism 76 which controls the rate of feeding the carcasses to the shear zone 14. Referring to FIG. 5, the bumper mechanism 76 includes a bumper member 78 which is slidably mounted on the frame 9 for reciprocating movement toward and away from the shear zone 14. The illustrated bumper member 78 has slide bearing members 80 mounted at opposite ends which engage upper flanges 82 of I-beams 84 mounted horizontally on the shelf member 30.

Linear motors or actuators 86 have opposite ends connected between the bearing members 80 and the beams 84. The linear actuators 86 are preferably hydraulic cylinders and can be either manually controlled or automatically controlled to cyclically reciprocate toward and away from the rotor assembly 6. The cylinders 86 can be controlled manually to set a desired spacing between the bumper 78 and the rotor assembly 6. Cyclical control of the cylinders 86 allows reciprocating movement of the bumper 78 to effectively "churn" a plurality of carcasses within the hopper 66, in cooperation with the axial movement caused by the staggering of the rotor teeth 2, to increase the effectiveness of feeding of tire carcasses into the shear zone 14 by preventing the carcasses from becoming wedged within the hopper 66.

Figure 2:
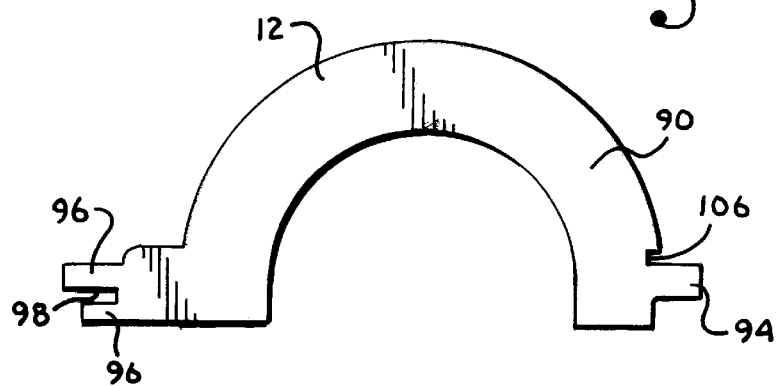
FIG. 2 is a side elevational view at an enlarged scale of a bridge plate which forms a part of feed control structure of the tire chopping apparatus.

Referring to FIGS. 2–4, the bridge plates 12 extend between the rotor assembly 6 and the shear bar assembly 7 to effectively form a grate which limits the size of tire fragments which can pass through the shear zone 14. The bridge plates 12 include a curved bight segment 90 with outwardly projecting mounting segments 92 and 94. A first mounting segment 92 includes a pair of tabs 96 which form a notch 98 therebetween. The notch 98 engages a bridge mounting flange 100 extending from beneath a horizontal frame member 102. An upper one of the tabs 96 is positioned between the flange 100 and a lower end of a side wall 70 of the hopper 66. The opposite projection 94 rests on a shoulder 104 formed on the shear bar support member 24 and extends beneath a point 26 of one of the shear teeth 3. A clearance notch 106 is formed above the projection 94 and receives the point of the associated shear tooth 3 which secures the particular bridge plate 12 in place. To remove one of the bridge plates 12, its associated shear tooth 3 is removed, and the bridge plate is pivoted about the opposite projection 96. The bridge plates 12, as a whole, limit engagement of carcasses with the rotor assembly 6 since, in the illustrated apparatus 1, only the pointed ends 59 extend past the outer circumferential periphery of bight segments 90 of the bridge plates 12.

The apparatus 1 preferably includes a system of conveyors 112 (FIGS. 1 and 4) to carry away fragments of processed tire carcasses. The conveyors 112 include a shear zone section 114 (FIG. 4) positioned below the shear zone 14 and extending parallel to the axis of the rotor assembly 6. Additionally, the vehicle chassis 20 includes a swing-out conveyor section 116 which can be pivoted outwardly from the vehicle 21 about a front end 118. The swing-out section 116 can also be elevated and lowered about the front end 118 to deposit tire fragments onto the ground or into another vehicle for transportation to another site. The shear zone conveyor 114 and swing-out conveyor 116 are interconnected by an intermediate conveyor section (not shown) which extends transverse to the chassis 20.

The apparatus 1 preferably includes a mechanism to load tire carcasses into the hopper 66, such as a boom mounted grapple 120 mechanism (FIG. 1). The illustrated grapple mechanism 120 is mounted on the chassis 20 and is operated hydraulically. The illustrated vehicle 21 includes a driver cab 122 and an operator cab 124. The driver cab 122 has driver controls (not shown) for operating the vehicle 21 over roads. The operator cab 124 includes controls (not shown) for operating the apparatus 1 and preferably faces the rear of the chassis 20. The cab 124 may be removable for transportation of the vehicle 21 over roads to thereby reduce the overall height of the vehicle.

First Modified Embodiment

FIG. 6 illustrates a modified embodiment 126 of the rotor assembly 6 of the apparatus 1 of the present invention. The modified rotor assembly 126 includes a mandrel 128 on which are positioned modified tooth support plates or wheels 130 on which are mounted modified rotary teeth 132. The teeth 132 are secured to the mounting plates 130 by fasteners, such as bolts 134. The illustrated rotor assembly 126 includes two teeth 132 per mounting plate 130, although it is foreseen that the plates 130 could be configured for a greater number of teeth 132. The rotor assembly 126 is adapted particularly for reducing materials other than tire carcasses, such as materials from building demolition. The teeth 132 of the assembly 126 are preferably staggered angularly in chevron patterns, similar to the rotor teeth 2 of the rotor assembly 6, and for similar reasons. The rotor assembly 126 is preferably used with a set of bridge plates (not shown) substantially similar to the bridge plates 12. The modified rotor assembly 126 is mounted on the frame 9 in place of the rotor assembly 6 and is operated with appropriately shaped stationary teeth (not shown) positioned on the shear bar support member 24.

Second Modified Embodiment

Figure 7:
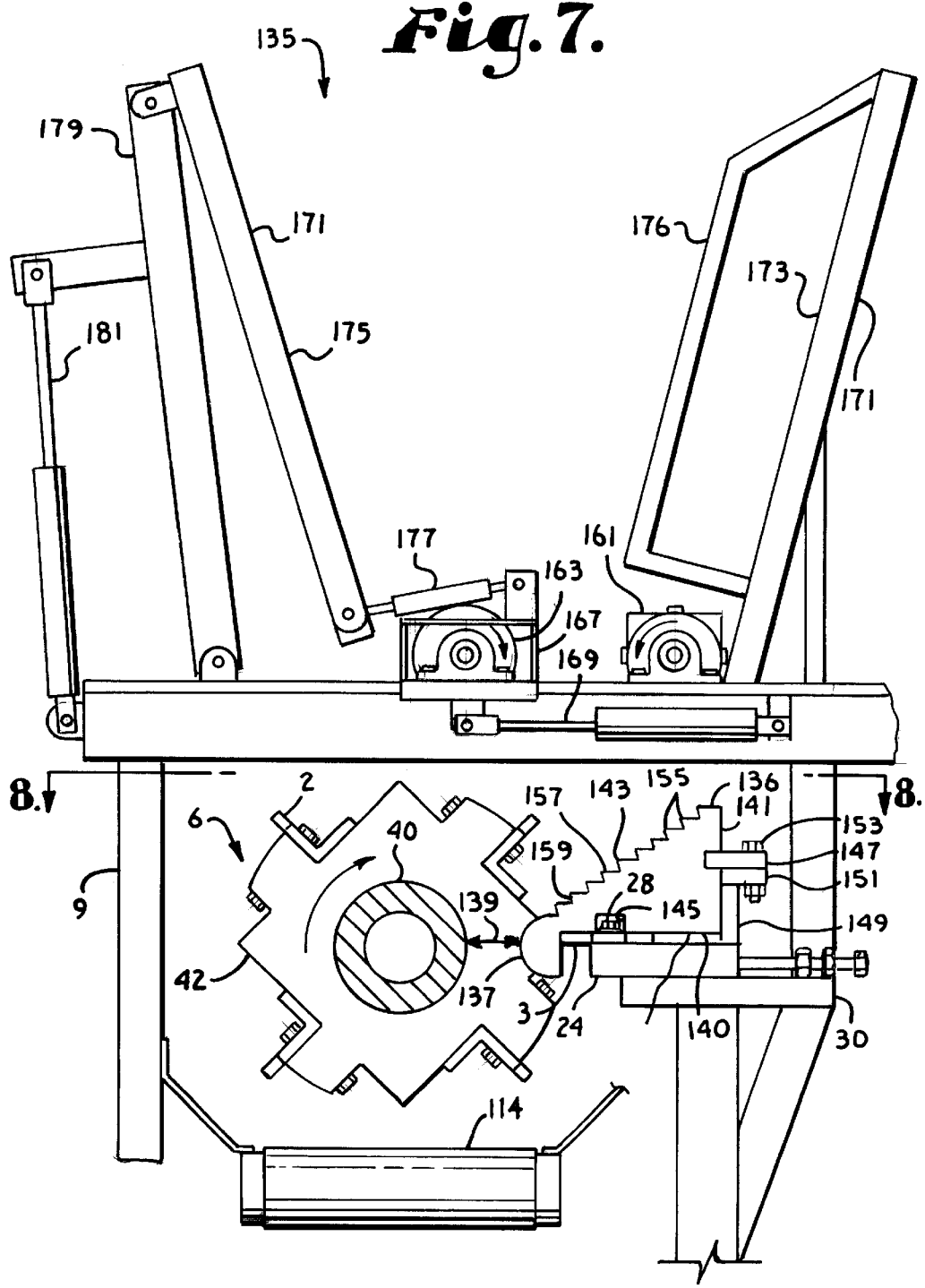
FIG. 7 is a fragmentary sectional view of a second modified embodiment of the apparatus of the present invention and illustrates details of the rotor and shear bar of the apparatus.

It has been found that, when grinding steel belted radial tires, the material from the steel belts can become looped around the bridge plates 12 and accumulate thereon in a manner which creates an impediment to effective grinding. Under such grinding conditions, a second modified embodiment 135 of the apparatus, shown in FIGS. 7 and 8, wherein the bridge plates 12 are replaced with upstanding guard plates 136, can be utilized The guard plates 136 are mounted to the shear bar support member 24, each in vertical alignment with one of the stationary shear teeth 3, such that the plates 136 each extend upwardly from the shear bar support member 24 and outwardly toward the rotor assembly 6. Instead of extending completely over the mandrel 40 and attaching to a sidewall 70 as do the bridges 12, the guard plates 136 are cantilevered from the shear bar support member 24 and have a distal end 137 which is in spaced relation with the mandrel 40, leaving a gap 139 therebetween. As best seen in FIG. 8, the guard plates 136 are of a thickness which allows them to fit between adjacent ones of the tooth support wheels 42 without interfering with the rotation of the rotor assembly 6.

Each of the guard plates 136 has a bottom edge 140, an upwardly extending rear edge 141 and a top edge 143 which slopes downwardly from the rear edge 141 toward the distal end 137. The bottom edge 140 of each guard plate 136 is welded to a respective one of the stationary teeth 3. A notch 145 is provided in each guard plate bottom edge 140 to provide clearance for the head of the respective shear tooth bolt 28. A mounting tab or flange 147 is fixedly connected to each guard plate 136 so as to extend outwardly from the rear edge 141. An upwardly extending back plate 149 is fixedly connected to the shear bar support member 24 proximate the rear edges 140 of the guard plates 136, and a generally horizontal mounting plate 151 is attached to the upper edge of the back plate 149. Mounting bolts 153 secure the mounting flanges 147 of the guard plates 136 to the mounting plate 151.

The distal ends 137 of the guard plates 136 have a rounded profile which forms a continuous curve with the top edge surface 143. The downward slope of the top edge surfaces 143 and rounded profile of the distal ends 137 allow any steel belt material which becomes entrained over the guard plates 136 to slide off of the plate 136 and fall through the respective gap 139 onto the conveyor 114. The gaps 139 should be of a sufficient breadth to allow the steel belt material to fall through, while still being narrow enough to prevent large unground chunks of tire carcass from being pulled through by the rotor teeth 2.

In addition to serving as guards to limit the size of fragments which can pass through a shear zone 14, the guard plates 136 also serve to help keep the tire carcasses from being pushed backward and out of the shear zone 14 by the action of the rotor assembly 6. In order to facilitate this second function, the top edge surface 143 of each guard plate 136 is provided with a plurality of teeth 155 arranged in a stair-step or ratchet pattern. Each tooth 155 has a generally horizontal top surface 157 and a generally vertical or undercut riser surface 159. As the tire carcasses move toward the shear zone 14, the carcasses slide easily over the teeth 155. If the carcasses attempt to move away from the shear zone 14, however, the carcasses encounter the tooth riser surfaces 159 which inhibit further backward movement of the carcasses.

Because the guard plates 136 extend upwardly from the shear bar assembly 7, the guard plates 136 would interfere with a bumper 78 as previously described. In place of the bumper 78, the apparatus 136 utilizes first and second feed rollers 161 and 163, respectively, to urge the tire carcasses into the shear zone 14. Each of the feed rollers 161 and 163 is oriented generally parallel to and spaced above the rotor assembly 6. The feed rollers 161 and 163 are preferably driven by hydraulic motors (not shown) and rotate in opposing directions so as to move the tire carcasses inwardly toward the shear zone 14. The first feed roller 161 is rotatably mounted to the framework 9 in a fixed position. The second feed roller 163 is rotatably mounted to carriages 167 which are, in turn, slidably mounted on the framework 9 such that the spacing between the second feed roller 163 and the first feed roller 161 is adjustable. The carriages 167 are moved by respective hydraulic actuators 169 connected between the carriages 167 and the framework 9.

The hopper 66 previously described is replaced with an adjustable hopper 171 which cooperates with the feed rollers 161 and 163. The hopper 171 includes a first and second sloped sidewalls 173 and 175. The first sidewall 173 is fixedly mounted to the framework 9 and slopes inwardly from an upper edge to a lower edge located proximate the first feed roller 161. The first sidewall 173 may be equipped with a plurality of longitudinally spaced parallel rails 176 which extend outwardly from the sidewall 173 and serve to impede movement of the tire carcasses parallel to the longitudinal axis of the rotor 6. The lower end of the second sidewall 175 is pivotally connected to the carriages 167 by links 177 such that the lower edge remains proximate the second feed roller 163, wherever the feed roller 163 is located. The second sidewall 175 is connected to the framework 9 through a pivot frame 179 such that the angle of the second sidewall 175 with respect to vertical is adjustable. The pivot frame 179 is pivotally connected to the framework 9 at a lower end, and to an upper portion of the second sidewall 175 at an upper end. A hydraulic actuator 181 is connected between the pivot frame 179 and the framework 9 for changing the angle of the second sidewall 175.

It is to be understood that while certain forms of the present invention have been illustrated and described herein, it is not to be limited to the specific forms or arrangement of parts described and shown. For example, while the feed rollers 161 and 163 and the adjustable hopper 171 are shown in conjunction with the second modified embodiment 135, these elements could also be incorporated into the apparatus 1 in place of the bumper 78.

What is claimed and desired to secured by Letters Patent is as follows:

1. A tire chopping apparatus for chopping a tire carcass into smaller tire fragments and comprising:
   a) a frame;
   b) an elongated rotor assembly journaled on said frame to rotate about a rotor axis and including a plurality of chopper discs spaced axially therealong, each chopper disc including a set of outwardly extending and circumferentially spaced rotor teeth;
   c) a motor drivingly engaged with said rotor assembly and selectively operable to cause rotation of said rotor assembly;
   d) an elongated shear bar assembly connected to said frame, extending parallel to said rotor assembly, and positioned in spaced relation thereto, said shear bar assembly including a plurality of shear teeth so positioned therealong relative to the sets of rotor teeth that said rotor teeth cyclically revolve into respective shear relationships with said shear teeth; and
   e) a plurality of guards extending outwardly from said shear bar assembly between adjacent sets of said rotor teeth toward said rotor mandrel, said guards being spaced apart in such a manner as to limit the size of objects passing between said rotor assembly and said shear bar assembly.

2. The tire chopping apparatus as set forth in claim 1, wherein at least one of said plurality of guards comprises a bridge plate spanning said rotor mandrel and connecting to said frame at a point opposite said shear bar assembly.

3. The tire chopping apparatus as set forth in claim 2 and further including:
   a) an elongated feed bumper extending substantially parallel to said rotor assembly and slidably mounted on said frame to enable movement of said bumper toward and away from said rotor assembly; and
   b) a feed bumper motor engaged between said frame and said bumper to cause said movement toward and away from said rotor assembly to thereby control feeding of a tire carcass into engagement with said rotor teeth and said shear bar assembly.

4. The tire chopping apparatus as set forth in claim 1, wherein at least one of said plurality of guards comprises an upstanding guard plate, said guard plate extending upwardly from said shear bar assembly to a guard plate top edge and having a distal end extending outwardly toward and in horizontally spaced relation to said rotor mandrel.

5. The tire chopping apparatus as set forth in claim 4, wherein said guard plate top edge slopes downwardly from an upper extremity thereof toward said distal end.

6. The tire chopping apparatus as set forth in claim 5, wherein said guard plate top edge further includes a plurality of teeth, each of said teeth having a top surface and a generally vertical or undercut riser surface, said tooth riser surfaces being positioned to engage a tire carcass moving away from said rotor assembly and impede said movement.

7. The tire chopping apparatus as set forth in claim 1 and further including a tire carcass orienting barrier connected to said frame and positioned relative to said rotor assembly to urge a tire carcass toward a substantially upstanding orientation to facilitate engagement of said rotor teeth with said carcass.

8. An apparatus as set forth in claim 1 and further including a shear bar adjustment mechanism engaged between said shear bar assembly and said frame and enabling adjustment of said shear relationships between said rotor teeth and said shear teeth.

9. The tire chopping apparatus as set forth in claim 1 and further including hopper walls forming a hopper assembly mounted on said frame in such a position as to receive a tire carcass and direct same toward engagement with said rotor teeth and said shear teeth.

10. The tire chopping apparatus as set forth in claim 1 and further including:
   a) first and second feed rollers rotatably mounted on said frame above and generally parallel to said rotor assembly; and
   b) a drive mechanism for rotating said feed rollers in opposing directions so as to urge a tire carcass into engagement with said rotor teeth and shear teeth.

11. The tire chopping apparatus as set forth in claim 10 wherein said second feed roller is slidably mounted to said frame for selective movement toward or away from said first feed roller.

12. The tire chopping apparatus as set forth in claim 11 and further including first and second hopper walls mounted on said frame in such a position as to receive a tire carcass and direct same toward said first and second feed rollers.

13. The tire chopping apparatus as set forth in claim 12 wherein a lower end of said second hopper wall is slidably mounted to said frame for movement in unison with said second feed roller.

14. The tire chopping apparatus as set forth in claim 13 wherein said first hopper wall is pivotally mounted to said framework such that the orientation of said first hopper wall with respect to vertical is adjustable.

15. A tire chopping apparatus for chopping a tire carcass into smaller tire fragments and comprising:
   a) a frame;
   b) an elongated rotor assembly including a rotor mandrel rotatably mounted to said frame and a plurality of axially spaced sets of outwardly extending and circumferentially spaced rotor teeth connected to said mandrel;
   c) a motor drivingly engaged with said rotor assembly and selectively operable to cause rotation of said rotor assembly;
   d) an elongated shear bar assembly connected to said frame, extending parallel to said rotor mandrel, and positioned in spaced relation thereto, said shear bar assembly positioned relative to said sets of rotor teeth such that said rotor teeth cyclically revolve into shear relationship with said shear bar assembly; and
   e) a plurality of upstanding guard plates extending upwardly from said shear bar assembly to respective guard plate top edges and outwardly toward said rotor mandrel, said guard plates each having a respective distal end in horizontally spaced relation to said rotor mandrel, said guard plates being positioned between adjacent sets of said rotor teeth and spaced apart in such a manner as to limit the size of objects passing between said rotor assembly and said shear bar assembly.

16. The tire chopping apparatus as set forth in claim 15, wherein each said guard plate top edge slopes downwardly from an upper extremity thereof toward said distal end.

17. The tire chopping apparatus as set forth in claim 16, wherein each said guard plate top edge further includes a plurality of teeth, each of said teeth having a top surface and a generally vertical or undercut riser surface, said tooth riser surfaces being positioned to engage a tire carcass moving away from said rotor assembly and impede said movement.

18. The tire chopping apparatus as set forth in claim 15 and further including a tire carcass orienting barrier connected to said frame and positioned relative to said rotor assembly to urge a tire carcass toward a substantially upstanding orientation to facilitate engagement of said rotor teeth with said carcass.

19. The tire chopping apparatus as set forth in claim 15 and further including a shear bar adjustment mechanism engaged between said shear bar assembly and said frame and enabling adjustment of said shear relationships between said rotor teeth and said shear bar assembly.

20. The tire chopping apparatus as set forth in claim 15 wherein:
   a) said rotor assembly includes a plurality of chopper discs axially spaced therealong; and
   b) each chopper disc includes one of said sets of outwardly extending and circumferentially spaced rotor teeth.

21. The tire chopping apparatus as set forth in claim 15, wherein said shear bar assembly includes:
   a) a plurality of stationary shear teeth positioned in spaced relation therealong; and wherein
   b) said shear teeth are positioned relative to said sets of rotor teeth such that said rotor teeth cyclically revolve into respective shear relationships with said shear teeth.

22. The tire chopping apparatus as set forth in claim 15 and further including hopper walls forming a hopper assembly mounted on said frame in such a position as to receive a tire carcass and direct same toward engagement with said rotor and said shear bar assembly.

23. The tire chopping apparatus as set forth in claim 15 and further including:
   a) first and second feed rollers rotatably mounted on said frame above and generally parallel to said rotor assembly; and
   b) a drive mechanism for rotating said feed rollers in opposing directions so as to urge a tire carcass into engagement with said rotor teeth and shear teeth.

24. The tire chopping apparatus as set forth in claim 23 wherein said second feed roller is slidably mounted to said frame for selective movement toward or away from said first feed roller.

25. The tire chopping apparatus as set forth in claim 24 and further including first and second hopper walls mounted on said frame in such a position as to receive a tire carcass and direct same toward said first and second feed rollers.

26. The tire chopping apparatus as set forth in claim 25 wherein a lower end of said second hopper wall is slidably mounted to said frame for movement in unison with said second feed roller.

27. The tire chopping apparatus as set forth in claim 26 wherein said first hopper wall is pivotally mounted to said framework such that the orientation of said first hopper wall with respect to vertical is adjustable.

28. A tire chopping apparatus for chopping a tire carcass into smaller tire fragments and comprising:
   a) a frame;
   b) an elongated rotor assembly including a rotor mandrel rotatably mounted to said frame and a plurality of axially spaced sets of outwardly extending and circumferentially spaced rotor teeth connected to said mandrel;
   c) a motor drivingly engaged with said rotor assembly and selectively operable to cause rotation of said rotor assembly;
   d) an elongated shear bar assembly connected to said frame, extending parallel to said rotor mandrel, and positioned in spaced relation thereto, said shear bar assembly positioned relative to said sets of rotor teeth such that said rotor teeth cyclically revolve into shear relationship with said shear bar assembly;
   e) a plurality of upstanding guard plates extending upwardly from said shear bar assembly to respective guard plate top edges and outwardly toward said rotor mandrel, said guard plates each having a respective distal end in horizontally spaced relation to said rotor mandrel, said guard plates being positioned between adjacent sets of said rotor teeth and spaced apart in such a manner as to limit the size of objects passing between said rotor assembly and said shear bar assembly, said guard plate top edges each including a plurality of teeth, each of said teeth having a top surface and a generally vertical or undercut riser surface, said tooth riser surfaces being positioned to engage a tire carcass moving away from said rotor assembly and impede said movement;
   f) first and second feed rollers rotatably mounted on said frame above and generally parallel to said rotor assembly, said second feed roller being slidably mounted to said frame for selective movement toward or away from said first feed roller;
   g) a drive mechanism for rotating said feed rollers in opposing directions so as to urge a tire carcass into engagement with said rotor teeth and shear teeth; and
   h) first and second hopper walls mounted on said frame in such a position as to receive a tire carcass and direct same toward said first and second feed rollers, a lower end of said second hopper wall being slidably mounted to said frame for movement in unison with said second feed roller.

29. The tire chopping apparatus as set forth in claim 28 wherein said first hopper wall is pivotally mounted to said framework such that the orientation of said first hopper wall with respect to vertical is adjustable.

\* \* \* \* \*